United States Patent
Dorn et al.

(10) Patent No.: US 7,827,496 B2
(45) Date of Patent: Nov. 2, 2010

(54) METHOD AND SYSTEM FOR DYNAMICALLY GENERATING USER INTERFACES

(75) Inventors: Karlheinz Dorn, Kalchreuth (DE);
Christian Scharf, Herzogenaurach (DE); Michael Schnitzke, Erlangen (DE); Hans-Martin Von Stockhausen, Erlangen (DE)

(73) Assignee: Siemens Aktiengesellschaft, Muncih (DE)

( * ) Notice: Subject to any disclaimer, the term of this patent is extended or adjusted under 35 U.S.C. 154(b) by 1231 days.

(21) Appl. No.: 10/980,303

(22) Filed: Nov. 4, 2004

(65) Prior Publication Data
US 2005/0097579 A1    May 5, 2005

(30) Foreign Application Priority Data
Nov. 4, 2003    (DE)    ................. 103 51 351

(51) Int. Cl.
*G06F 3/00* (2006.01)
*G06F 17/00* (2006.01)

(52) U.S. Cl. .............. 715/746; 715/234; 715/762

(58) Field of Classification Search .......... 715/700, 715/866, 762–763, 234–239, 744–747; 719/330
See application file for complete search history.

(56) References Cited

U.S. PATENT DOCUMENTS

| | | | |
|---|---|---|---|
| 6,404,445 B1 * | 6/2002 | Galea et al. | 715/853 |
| 6,476,828 B1 * | 11/2002 | Burkett et al. | 715/760 |
| 6,789,252 B1 * | 9/2004 | Burke et al. | 717/100 |
| 2002/0046221 A1 * | 4/2002 | Wallace et al. | 707/513 |
| 2002/0059425 A1 * | 5/2002 | Belfiore et al. | 709/226 |
| 2002/0109718 A1 * | 8/2002 | Mansour et al. | 345/744 |
| 2002/0111995 A1 * | 8/2002 | Mansour et al. | 709/203 |
| 2003/0046616 A1 * | 3/2003 | Feng et al. | 714/47 |

FOREIGN PATENT DOCUMENTS

| WO | WO 01/98936 | * 12/2001 |
|---|---|---|
| WO | WO 0198936 A2 | 12/2001 |

OTHER PUBLICATIONS

College/yukondude, 2002, "Comp 225, Generic Software Configuration and Installation".*
Liu et al., May/Jun. 1999, "Knowledge and Data Engineering, Design and Evaluation of a Generic Software Architecture for On-Demand Video Servers". pp. 406-424.*
Mueller et al., "Using XML to Semi-automatically Derive User Interfaces", Proceedings of the Second International Workshop on User Interfaces to Data Intensive Systems (UIDIS'01), IEEE 2001, pp. 91-95.*
Chinese Office Action.

* cited by examiner

*Primary Examiner*—William L Bashore
*Assistant Examiner*—Andrew Tank
(74) *Attorney, Agent, or Firm*—Harness, Dickey & Pierce, P.L.C.

(57) ABSTRACT

A method and a system are for dynamically generating user interfaces for an application, independently of resolution and platform. In this case, a configuration file is read in and interpreted. A layout engine generates the user interface by accessing a mapping which assigns a respective control event to an event handler.

27 Claims, 1 Drawing Sheet

METHOD AND SYSTEM FOR DYNAMICALLY GENERATING USER INTERFACES

The present application hereby claims priority under 35 U.S.C. §119 on German patent application number DE 103 51 351.5 filed Nov. 4, 2003, the entire contents of which are hereby incorporated herein by reference.

FIELD OF THE INVENTION

The invention generally relates to a method and a system for generating user interfaces for an application, in which the user interface runs on at least one target system and can include a plurality of monitors.

BACKGROUND OF THE INVENTION

In older systems from the prior art, configuring the user interface was part of the respective application's code. However, this led to the user interface also having to be concomitantly changed when changing or updating the code. This led to increased programming and maintenance complexity.

In order to avoid this disadvantage, web browsers, in particular, have hitherto been used together with a markup language (the Hypertext Markup Language (HTML)) in order to be able to generate user interfaces which are at least very largely independent of the target system's parameters, for example the resolution and the respective platform. The mechanism on which HTML is based provides for "tags" to be used to prescribe the manner in which a particular part of a document is to be presented by an application, for example a WWW browser. However, the HTML-based procedure of the prior art requires a high level of programming complexity, since HTML is restricted in many respects.

A HTML-based application, for example, therefore needs to be interpreted by a browser which is generally not designed to execute applications. This leads to long processing times.

The HTML-based generation of user interfaces furthermore requires that, for a new user with different parameters for the user interface, for example a different resolution, one and the same application must be rewritten for the changed requirements associated with the new user.

User interfaces which can be changed dynamically when the application is running can also scarcely be generated or can be generated only with a very high level of complexity and high susceptibility to error. The previous procedure therefore holds some disadvantages.

SUMMARY OF THE INVENTION

It is therefore an object of an embodiment of the invention to indicate a way in which user interfaces can be generated independently of resolution and platform and can, at the same time, be changed dynamically and configured remotely.

An object may be achieved, in particular, by way of a method for generating a multimonitor user interface on at least one target system for an application. The method may include accessing a configuration file which describes at least components, particularly visual components, of a layout for the user interface to be generated. The user interface may be generated by reading in and/or interpreting the configuration file, with the generation of the user interface being isolated, in terms of data processing, from the target system and/or the application. Further, it is also possible to dynamically configure the user interface (which has been generated) when the application is running.

An object may furthermore be achieved by a system, in particular by way of a system for generating a multimonitor user interface on at least one target system for an application. The system may include:
  at least one configuration file which describes at least components, particularly visual components, of a layout for the user interface to be generated, and
  at least one layout engine which has multimonitor capability, reads in and interprets the configuration file and/or generates the user interface, the layout engine being isolated, in terms of data processing, from the application and/or the target system.

A fundamental concept of an embodiment of the invention is based on the fact that a central mechanism, the "layout engine", is based on dividing up visual components and event-related components. In other words, a distinction is made between:
  tasks which require the manner in which an object is to be presented to be defined, and
  tasks which require the intended meaning or content of an object to be defined.

The fundamental mechanisms for creating a user interface are generically available according to an embodiment of the invention and can be used for any desired applications, since, as a modular component, they are isolated from the respective specific application.

On the basis of the—preferably XML-based—configuration file, the layout engine uses additional entries and/or commands from a user to automatically or at least semi-automatically create an interface for the respective application.

This is preferably effected at the request of the application, i.e. the user interface is generated in a manner triggered by the user.

One advantageous development of an embodiment of the invention provides for the configuration file to be generated internally by a component in the inventive system or method, while, in a preferred embodiment, the externally generated configuration file is accessed only once, and suitable interfaces are made available.

The layout engine does not define and include any application semantics or implementation models. The logic circuitry for generating the user interface is therefore encapsulated according to an embodiment of the invention and can be used generically regardless of the respective application.

The modular architecture of the inventive solution makes it possible for the configuration file, the layout engine and/or the application logic circuitry to be resident or to be located on server-based resources.

It is furthermore possible for the target system, on which the user interface is to be generated or is to run, to be stored at a different location than the application itself.

In one advantageous development of an embodiment of the invention, the SOAP protocol is used to forward a user interface control, which has been generated by the layout engine, to a web service. The SOAP protocol (Simple Object Access Protocol) is a protocol which is designed to interchange information in a decentralized distributed environment and is thus suited to interchanging information between the modules of an embodiment of the invention.

The layout engine preferably loads the XML file using the HTTP protocol. In both cases, however, specifically defined protocols may also be used.

The user interface which is generated according to an embodiment of the invention is preferably generated independently of a resolution and/or a platform of the target system, and/or the configuration file is preferably generated independently of program libraries for user interfaces.

In one advantageous alternative form of an embodiment of the invention, the configuration file and/or the user interface is/are generated automatically.

It has furthermore been shown to be advantageous that the user interface may also be configured remotely, thus increasing the system's flexibility.

In another advantageous development of an embodiment of the invention, the configuration file includes mapping rules which assign a respective control event to an event handler which can likewise be configured, the mapping being exclusively generic and being independent of the application and/or the target system.

In this case, it is possible for the event handler to be executed, on the one hand, locally on a client or, on the other hand, remotely on a server.

A preferred embodiment of the invention is based on the fact that the user interface is defined by a multiplicity of control fields, particularly controls, with the method being divided up into the following parts:
creating the control field,
positioning the control field, and
forwarding the control field to a configurable control handler.

The above-described inventive embodiments of the method may also be in the form of a computer program product which has a computer-readable medium and computer program code means and in the case of which, once the computer program has been loaded, the computer is prompted to carry out the inventive method described above.

One alternative way of achieving an object is provided by a storage medium which is intended to store the computer-implemented method described above and can be read by a computer.

BRIEF DESCRIPTION OF THE DRAWINGS

The following detailed description and the figures discusses the features and further advantages of exemplary embodiments which should not be understood to be restrictive, it being necessary to read said description in connection with the drawing, in which.

DETAILED DESCRIPTION OF THE EXEMPLARY EMBODIMENTS

A user interface UI is to be generated for an application A. The user interface or interface UI is to run on a target system Z which does not necessarily have to match the system on which the application A is running. This is effected according to an embodiment of the invention by accessing a layout engine LE which is of modular design and is functionally located on the target system Z between the application A and the user interface UI which has been generated.

Figure 1:
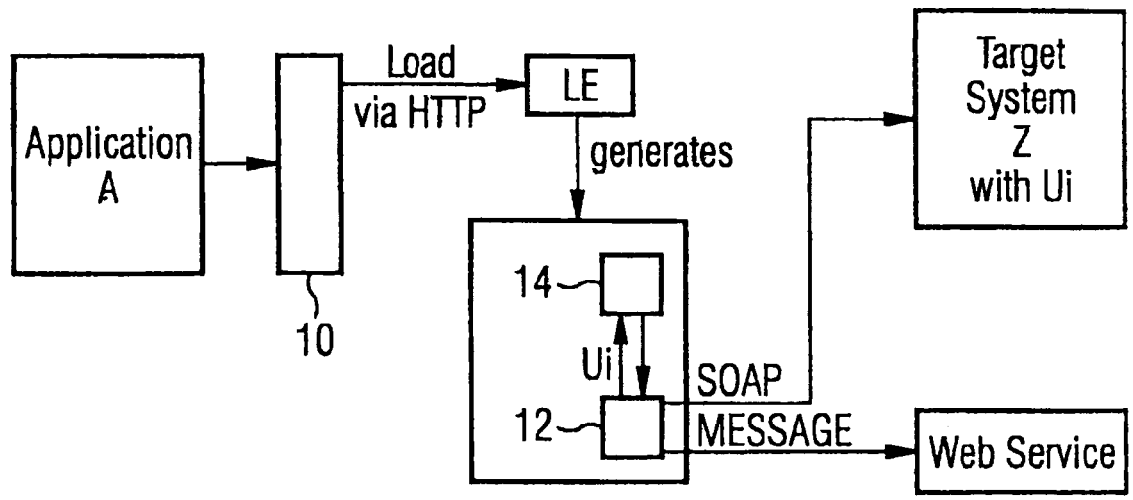
FIG. 1 shows a schematic illustration of an inventive architecture.

As FIG. 1 shows, an XML configuration file 10 is generated according to an embodiment of the invention on the basis of the application A.

The configuration file 10 describes, independently of the UI library, the layout for the interface UI to be generated. An embodiment of the invention thus achieves a degree of freedom that was not possible in the previous procedure of the prior art. Thus, the user interface UI generated according to an embodiment of the invention provides, for example, a different layout for a screen resolution of 1024×786 than for a resolution of 1280×1024. It is also possible, for example, for two or more new button controls 12 to be added in a variable manner.

A plurality of layout descriptions may be defined in the configuration file if there are a plurality of regions with layout areas. A plurality of layout descriptions thus allow the layout engine LE to be both independent of resolution and to implement layouts which can be changed dynamically.

Figure 2:
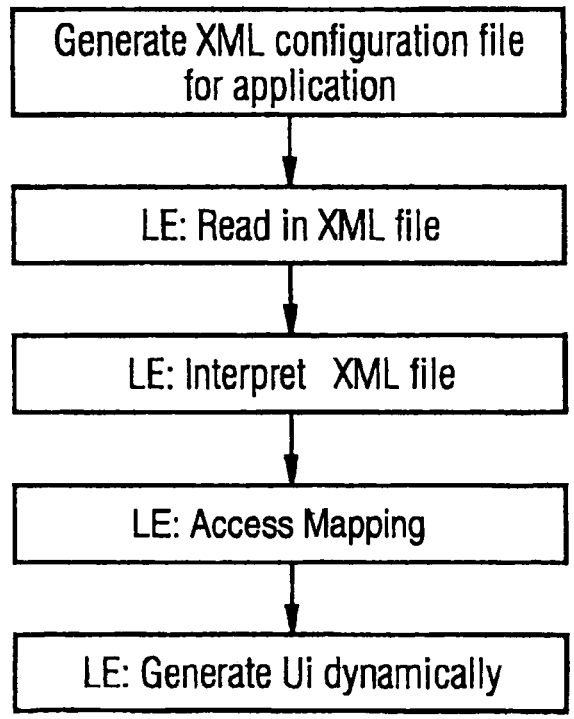
FIG. 2 shows a flowchart for a preferred embodiment of the invention.

The procedure in the preferred embodiment of the invention is explained below in connection with FIG. 2:

In this case, provision is made for the layout engine LE to read in the XML configuration file 10 on request. It is alternatively also possible for the configuration file 10 to be checked at predeterminable intervals of time to determine whether it is up to date and for it to be automatically forwarded to the layout engine LE.

The layout engine LE interprets the configuration file 10 after the latter has been read in. In this case, the layout engine LE accesses a mapping which is likewise stored in the configuration file 10.

The layout engine LE can then dynamically generate a layout and access the mapping or hardwire the event.

The mapping includes rules which are used as a basis for assigning a control event to an event handler 14. A control 12 may be defined as a control field for generating the user interface UI. One particular advantage of an embodiment of the present invention is that new controls 12 may also be added to the existing ones even when the application A is running. The interface UI which has been generated according to the invention can thus be dynamically changed and/or configured.

The inventive procedure makes it possible for any desired types of controls 12 to be processed, whereas, in the HTML-based procedure of the prior art, controls were available only to a limited extent (either with limited functionality or they must be simulated with a relatively high level of complexity, for example TreeViewControls).

The XML configuration file may be located on a web server. This advantageously greatly simplifies the installation of the interface UI. It is even possible for the event handlers 14 to be fully configured and thus to already include code which can be executed or loaded. According to an embodiment of the invention, no installation process then has to be carried out on the client or target system Z. This significantly increases the system's manageability.

In addition to the application-specific data, the XML configuration file 10 contains the mapping (or hardwiring) of the interface-related control events to the script event handlers 14 (these may have been programmed using JavaScript or Perl, for example) or directly to a web service, for example. According to an embodiment of the invention, the logic circuitry for the user interface UI, which hitherto has usually had to be programmed (by accessing UI libraries or, in web applications, by means of ASP.NET or JSP, for example, at the server end), is thus contained in full in the XML configuration file 10.

The event handlers 14 to be programmed are used as an encapsulated module and are completely separate from the layout for the user interface UI. Moreover, they may also be implemented independently of the platform, since they preferably communicate exclusively with modules in the layout engine LE. According to an embodiment of the invention, if UI events are directly hardwired to one or more web service (s) (or other services), advantageously nothing needs to be programmed.

One non-limiting example of an XML configuration file 10 is given below:

```xml
<UI>
<Layouts>
<Layout name="1024x786" default="">
<Areas>
<!-- It is possible to define various areas in which
the controls are placed -->
<Area name="area1" x="0" y="0" w="100" h="100"/>
<Area name="area2" x="101" y="0" w="100" h="400"/>
</Areas>
<Controls>
<!-- Controls reference an area; the coordinates of the
controls are relative to the area -->
<Control area="area1" name="Button1" type="Button"
x="10" y="10" w="40" h="20">
<!-- It is possible to define any desired properties of
the control -->
<Property name="color" value="red"/>
</Control>
<Control area="area2" name="Button2" type="Button"
x="40" y="10" w="40" h="20"/>
</Controls>
</Layout>
<!-- An alternative second layout -->
<Layout name="800x600">
<Areas>
<Area name="area1" x="0" y="0" w="100" h="100"/>
</Areas>
<Controls>
<Control area="area1" name="Button1" type="Button"
x="10" y="10" w="40" h="20"/>
</Controls>
</Layout>
<EventHandlers>
<!-- An event handler which is hardwired to a web
service -->
<Handler name="Handler1" type="WebService">
<!-- $1 is a wildcard which corresponds to the first
parameter in the <map> definition -->
<connection
url="https://www.myserver.com/services/buttonclick.aspx
?click=$1"/>
</Handler>
<!-- An event handler which contains inline script code
-->
<Handler name="Handler2" type="Script">
<script type="inline">
<!-- the transfer parameters for the handlers
correspond to the parameters in the <map> definition --
>
<code>
function foo( id ) { alert( "you clicked me!" + id );}
</code>
</script>
</Handler>
</EventHandlers>
<EventMapping>
<!-- Hardwires the Button1 "Click" event to Handler1
and transfers the property id of the control to this
handler as a parameter -->
<map name="EventMap1" control="Button1" event="Click"
handler="Handler1" entry="">
<param value="control.id"/>
</map>
<!-- Hardwires the Button2 "Click" event to Handler2,
calls its function foo and transfers the parameter -->
<map name="EventMap2" control="Button2" event="Click"
handler="Handler2" entry="foo">
<param value="control.id"/>
</map>
</EventMapping>
</UI>
```

The inventive steps for ".Net Windows Forms" (WinForms for short) are shown by way of example below:

```
//XML parsing omitted
//generate controls for areas and controls defined in
the XML configuration in WinForm and add them to the
// main form (myForm)
Areas[ ] theAreas = getAreas( xmlData );
foreach( Area area in theAreas ) {
Panel aPanel = new Panel( );
setPanelProperties( aPanel, area );//set panel
coordinates and other properties which the area defines
myForm.Controls.Add( aPanel );//add panel to the form
XMLConfigControl[ ] theControls = getControlsForArea(
area );
foreach( XMLConfigControl control in theControls ) {
Control aControl = ControlFactory.createControl(
control );//generate correct control type
setControlProperties( aControl, control );//set
coordinates and properties (which may have been
defined) of the control
aPanel.Controls.Add( aControl );
}
...
//generate event handler
...
//for each function for a script event handler one
separate EventHandler is returned
EventHandler[ ] theEventHandlers = getEventHandler(
xmlData );
foreach( EventHandler evtHandler in theEventHandlers )
{
Delegate aDelegate = zero;
if( evtHandler.type == EventHandlerTypes.WEBSERVICE ) {
aDelegate = createWebserviceDelegate( evtHandler,
evtHandler.params );
}else if( evtHandler.type == EventHandlerTypes.SCRIPT )
{
aDelegate = createScriptDelegate( evtHandler,
evtHandler.params );
}
addToEventHandlerCollection( aDelegate, evtHandler.name
);
}
...
//Hardwire the control events and event handler
...
EventMapping[ ] theEventMappings = getEventMappings(
xmlData );
foreach( EventMapping evtMap in theEventMappings ) {
Control aControl = findControl( evtMap.control );
EventInfo theEvent = getEvent( aControl, evtMap.event
);
Delegate aDelegate = findEventDelegate( evtMap.handler,
evtMap.entry );
//The parameters for the control event do not have to
match those for the event handler configured; event
//parameters must therefore be transformed into the
parameters expected by the handler delegate.
Delegate aEvtDelegate = createTransformEvtDelegate(
aDelegate, evtMap.params, theEvent );
theEvent.AddEventHandler ( aControl, aEvtDelegate );
}
...
```

Key to Figures

1. Application A
2. Load via HTTP
3. generates
4. Target system Z with Ui
5. Web service
6. Generate XML configuration file for application
7. LE: Read in XML file
8. LE: Interpret XML file
9. LE: Access mapping
10. LE: Generate Ui dynamically Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for generating a multimonitor user interface on at least one target system for an application, the method comprising:
   accessing a configuration file without accessing the application, the configuration file describing at least a visual component and a configurable control event of a layout for the user interface to be generated, with the visual component relating to presenting objects in the user interface and the configurable control event relating to defining the objects;
   generating the user interface by at least one of reading in and interpreting the configuration file, where the generating separately generates the visual component and the configurable control event of the configuration file, wherein
   the generation of the user interface is isolated, in terms of data processing, from the target system and the application,
   the configuration file includes a mapping which assigns the configurable control event to an event handler, the mapping assigning generically and independently of the application and the target system, and
   the at least one target system and the application are configured to run on different systems, each of the different systems including different platforms.

2. The method as claimed in claim 1, wherein the generated user interface is dynamically configurable when the application is running.

3. The method as claimed in claim 1, wherein the user interface is generated independently of at least one of a resolution and a platform of the target system.

4. The method as claimed in claim 1, wherein the configuration file is generated independently of program libraries for user interfaces.

5. The method as claimed in claim 1, wherein the configuration file is based on the XML protocol.

6. The method as claimed in claim 1, wherein at least one of the configuration file and the user interface is generated automatically.

7. The method as claimed in claim 1, wherein the configuration file is not located on the target system.

8. The method as claimed in claim 7, wherein the configuration file is located on a web server.

9. The method as claimed in claim 1, wherein the user interface is remotely configurable.

10. The method as claimed in claim 1, wherein the event handler is at least one of executed locally on a client and executed remotely on a server.

11. The method of claim 10, wherein the multiplicity of control fields are controls.

12. The method as claimed in claim 1, wherein the user interface is defined by a multiplicity of control fields, particularly controls, with the method being divided up into the following parts:
    creating the control field,
    positioning the control field, and
    forwarding the control field to a configurable event handler.

13. The method as claimed in claim 1, wherein the configuration file is located on a web server.

14. A computer-readable medium storing a computer program for generating a multimonitor user interface on a target system for an application, which when executed on a computer, cause the computer to execute instructions comprising:
    at least one configuration file describing at least a visual component and a configurable control event of a layout for the user interface to be generated, with the visual component relating to presenting objects in the user interface and the configurable control event relating to defining the objects; and
    at least one layout engine having multimonitor capability, with the at least one layout engine reading in and interpreting the configuration file without accessing the application and generating the user interface, where the at least one layout engine separately generates the visual component and the configurable control event of the configuration file, the layout engine being isolated, in terms of data processing, from the application, wherein
    the configuration file including a mapping which assigns the configurable control event to an event handler, the mapping assigning generically and independently of the application and the target system, and
    the at least one target system and the application are configured to run on different systems, each of the different systems including different platforms.

15. The computer-readable medium as claimed in claim 14, wherein the user interface is generated independently of at least one of a resolution and a platform of the target system.

16. The computer-readable medium as claimed in claim 15, wherein the configuration file is generated independently of program libraries for user interfaces.

17. The computer-readable medium as claimed in claim 14, wherein the configuration file is generated independently of program libraries for user interfaces.

18. The computer-readable medium as claimed in claim 14, wherein the configuration file is based on the XML protocol.

19. The computer-readable medium as claimed in claim 14, wherein at least one of the configuration file and the user interface is generated automatically.

20. The computer-readable medium as claimed in claim 14, wherein the configuration file is not located on the target system.

21. The computer-readable medium as claimed in claim 20, wherein the configuration file is located on a web server.

22. The computer-readable medium as claimed in claim 14, wherein the user interface is remotely configurable.

23. The computer-readable medium as claimed in claim 14, wherein the event handler is at least one of executed locally on a client and remotely on a server.

24. The computer-readable medium as claimed in claim 14, wherein a multiplicity of control fields are defined by a configurable control handler, and wherein the control field is created, positioned, and then forwarded to the configurable event handler.

25. The computer-readable medium as claimed in claim 24, wherein the multiplicity of control fields are controls.

26. The computer-readable medium as claimed in claim 14, wherein the configuration file is located on a web server.

27. A computer-readable medium storing a computer program for dynamically generating a user interface for an application, independently of resolution and platform, which when executed on a computer, causes the computer to execute instructions comprising:
    reading in and interpreting a configuration file without accessing the application, the configuration file describing at least a visual component and a configurable control event of a layout for the user interface to be generated, with the visual component relating to presenting objects in the user interface and the configurable control event relating to defining the objects; and generating the user interface by accessing a mapping of the configuration file which assigns generically and independently of the application a respective control event to an event handler where the generating separately generates the visual component and the configurable control event of the configuration file, wherein the at least one target system and the application are configured to run on different systems, each of the different systems including different platforms.

* * * * *